Figure 1:
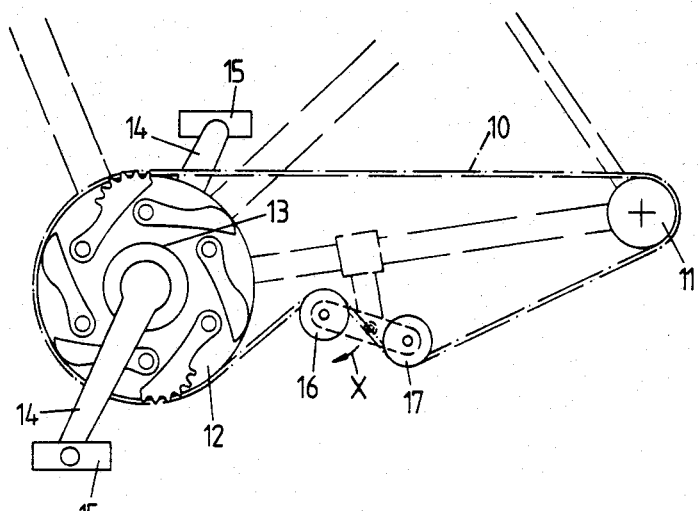

United States Patent [19]

Deal

[11] Patent Number: 4,618,331

[45] Date of Patent: Oct. 21, 1986

[54] VARIABLE RATIO TRANSMISSION

[76] Inventor: Michel Deal, Villers, 42460 Cunzier, France

[21] Appl. No.: 561,204

[22] Filed: Dec. 14, 1983

[30] Foreign Application Priority Data

Dec. 14, 1982 [GB] United Kingdom ............ 8235574

[51] Int. Cl.⁴ .................................................. F16H 9/02
[52] U.S. Cl. ........................................................ 474/49
[58] Field of Search .......................... 474/49, 50; 192/7

[56] References Cited

U.S. PATENT DOCUMENTS 1,092,098 3/1914 Fitzgerald ............................ 474/49
3,798,989 3/1974 Hunt ..................................... 474/49
4,478,594 10/1984 Gayer ............................... 474/49 X

FOREIGN PATENT DOCUMENTS 3137018 4/1983 Fed. Rep. of Germany ........ 474/49

*Primary Examiner*—James A. Leppink
*Assistant Examiner*—Frank McKenzie
*Attorney, Agent, or Firm*—Young & Thompson

[57] ABSTRACT

A variable ratio transmission for a bicycle or other purposes includes an automatically controlled variable diameter sprocket 12 comprising a rotary support disc 101 carrying a number of pivoted arms 102, two of which have toothed sectors 104 while the remainder have smooth sectors 105, the arms being interlocked to move in unison inwards and outwards. They are urged outwards by mechanical spring units 109 or gas accumulators 174 and the movement is controlled either by adjustable brakes 118, which are preferably unidirectional, or by crank operated brakes 131 under the control of the foot cranks 127. The position of the chain contact elements is also controlled automatically by a ratchet detent mechanism 152 and an hydraulic damper 157 and wear in the brakes is compensated automatically by the rotary ratchet mechanism 158,159.

14 Claims, 10 Drawing Figures

VARIABLE RATIO TRANSMISSION

This invention relates to a variable ratio transmission system of the type which includes a looped endless flexible tension element, such as a belt or chain running over two wheels one or both of which is of variable effective diameter. The term "wheel" as used herein is intended also to include a toothed rotary member or sprocket arranged to engage with the links of a chain. One particular application is to a bicycle chain transmission with automatic adjustment of the ratio, but the invention can also be applied to industrial or other transmissions.

A transmission of this general type has already been proposed in my co-pending U.K. Patent Application No. 2062142A and one of the objects of the invention is to provide improvements in the control and efficiency of the unit, which will facilitate manufacture, assembly and operation.

Broadly stated the invention consists in a rotary drive device for a variable ratio transmission mechanism including an endless flexible tension element, the device comprising a rotary support carrying a plurality of angularly spaced contact elements for the tension element, the contact elements being movable to vary their radial displacement from the axis of the support, and including resilient means urging the contact elements outwards, and control means arranged to exert a variable, adjustable, or controllable resisting force on the movement of the contact elements.

The control means is preferably adjustable automatically and in one form it is adjusted in accordance with the movement of the contact elements relative to the support. Alternatively the force may be adjusted automatically in response to the rotary speed or the torque applied to the rotary support. In one construction the rotary support is connected to an input drive member, which is capable of limited relative rotation, and the control means is responsive to changes in the torque transmitted between the drive member and the rotary support. For example, the input drive member may be the crank of a bicycle and the control means may act to vary the braking force in dependence on the torque applied by the crank.

The control means preferably provides a hysteresis effect between the inward and outward movement and preferably resists inward movement of the contact elements more strongly than outward movement. For example, the control may include a uni-directional friction brake, and according to a preferred feature of the invention the device also includes means for compensating automatically for wear in the brake.

The control means may include a hydraulic damper or control system, which preferably includes means for altering the flow to vary the damping effect. For example, the damper may be unidirectional, to resist inward movement of the contact elements, and in one form of the invention the damper also provides an inward resisting force and acts to prevent sudden outward movement of the contact elements.

According to another preferred feature the device includes an adjustable stop, limiting the radial movement of the contact elements either inwards or outwards.

Conveniently the tension element is a chain and there are less than four toothed contact elements engaging the chain, each toothed contact element being mounted on a pivoted arm.

In a preferred construction there are additional non-toothed contact elements interposed between the toothed contact elements, all the elements being rigidly secured to swinging arms pivotally mounted on the rotary support, and so arranged that the contact elements can move into positions closer to the main rotary axis than the pivots of the arms.

In any case the device preferably is included in combination with a system for locking the contact elements against radial movement over a sector of their movement around the axis of rotation.

Figure 2:
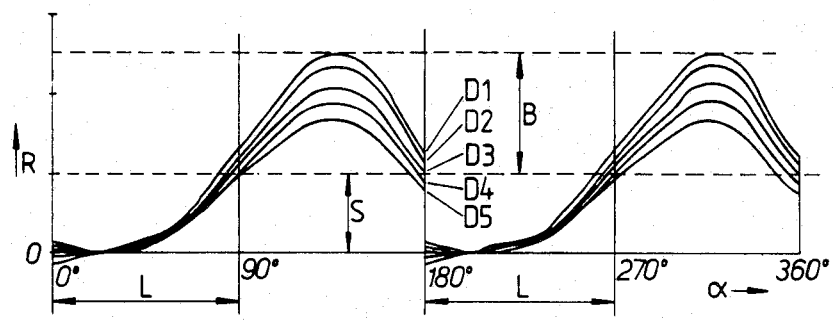
Figure 7:
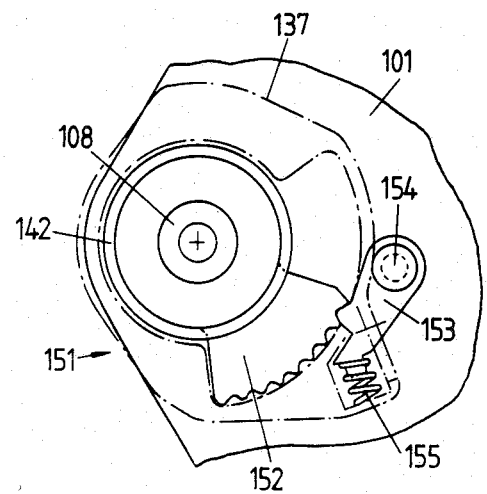
Figure 8:
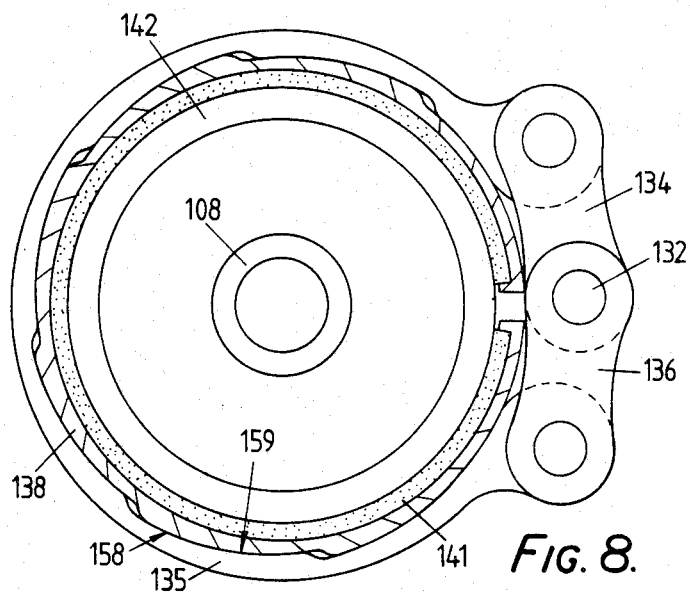
Figure 9:
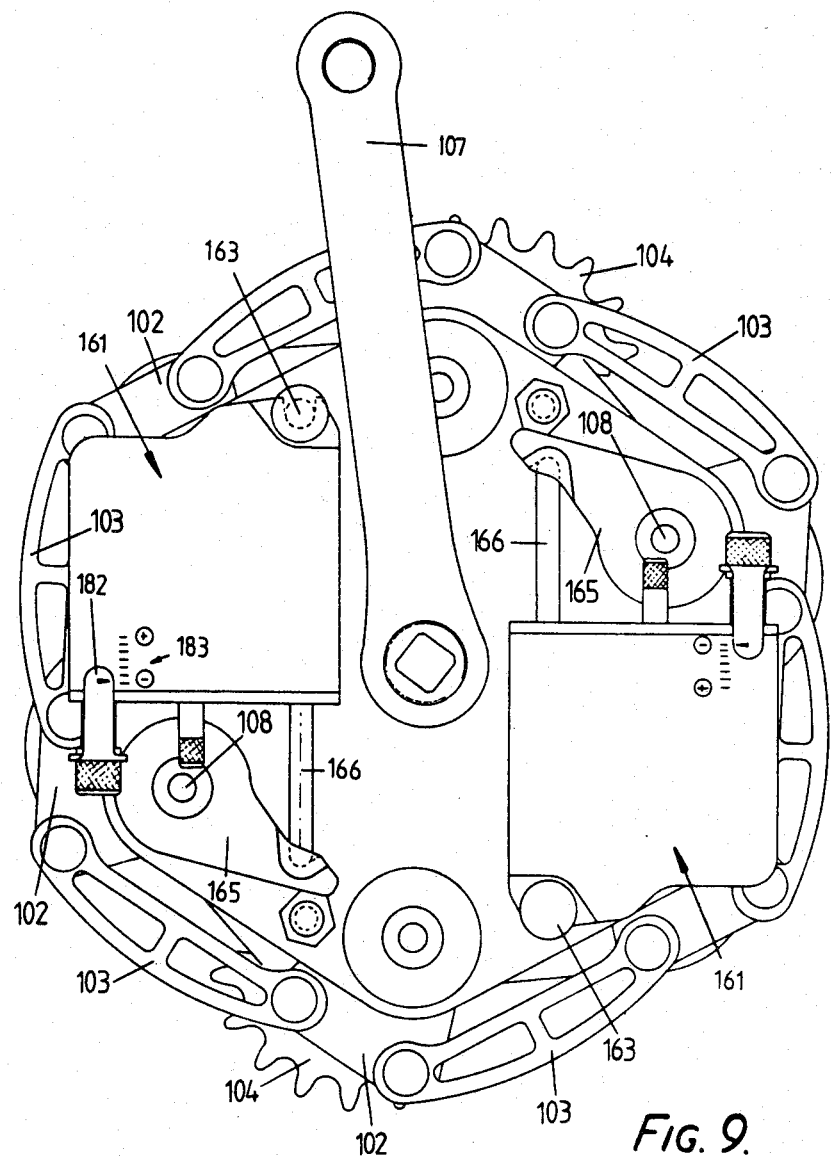
Figure 10:
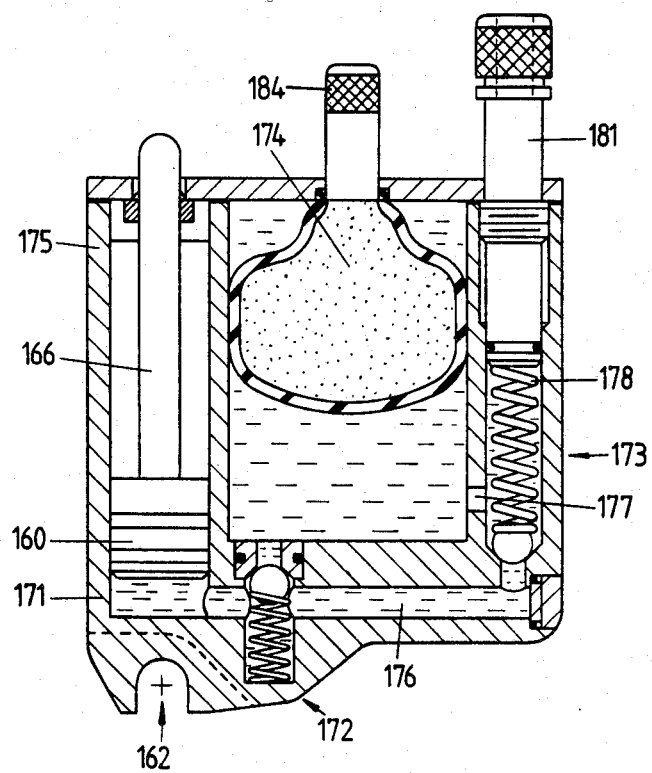

The invention may be performed in various ways and a number of embodiments will now be described by way of example with reference to the accompanying drawings, in which: FIG. 1 is a simplified diagram illustrating a variable ratio chain drive for a bicycle showing the radially movable chain contact elements on the driving sprocket, FIG. 2 is a graph illustrating the cyclic changes in the turning "moment" R exerted on each pivoted arm about its pivot axis, for five different sprocket diameters, FIGS. 3 and 4 are left and right hand side views of one form of adjustable chain sprocket according to the invention, FIG. 5 is a section through a one-way brake unit included in the sprocket of FIGS. 3 and 4, FIG. 6 is a right hand side view of a modified form of chain sprocket according to the invention, FIG. 7 illustrates one form of ratchet detent unit included in the sprocket of FIG. 6, FIG. 8 is a sectional side elevation through one of the brake units of the sprocket of FIG. 6, having automatic wear compensation, FIG. 9 is a side view of another example of variable diameter sprocket according to the invention, incorporating a hydraulic control system, and FIG. 10 is a diagrammatic sectional view through the hydraulic unit of FIG. 9, illustrating the method of operation.

The essential elements of a variable ratio drive for a bicycle are illustrated in FIG. 1, parts of the bicycle frame and wheels being omitted for convenience. The chain 10 runs over the rear sprocket 11 connected to the rear bicycle wheel, and also around the variable diameter drive sprocket 12 mounted to rotate in a bearing 13 on the frame, and attached to a pair of cranks 14 each having a pedal 15. Slack in the chain is taken up automatically by a pair of idler sprockets 16,17 mounted on a bracket and twisted in the direction of arrow X by a spring (not illustrated). The diameter of the sprocket 12 is varied automatically, as shown in detail in FIGS. 3 and 4, etc. One of the problems is to provide effective control of the diameter of the variable sprocket 12 as the bicycle experiences varying road conditions such as adverse gradients, head winds, and acceleration at start-up, and also to accommodate changes in the state of tiredness or strength of the rider, and the weight of the bicycle. A serious problem also arises from the cyclic variations in chain tension which occur naturally and inevitably as the bicyclist rotates the cranks 14.

Figure 3:
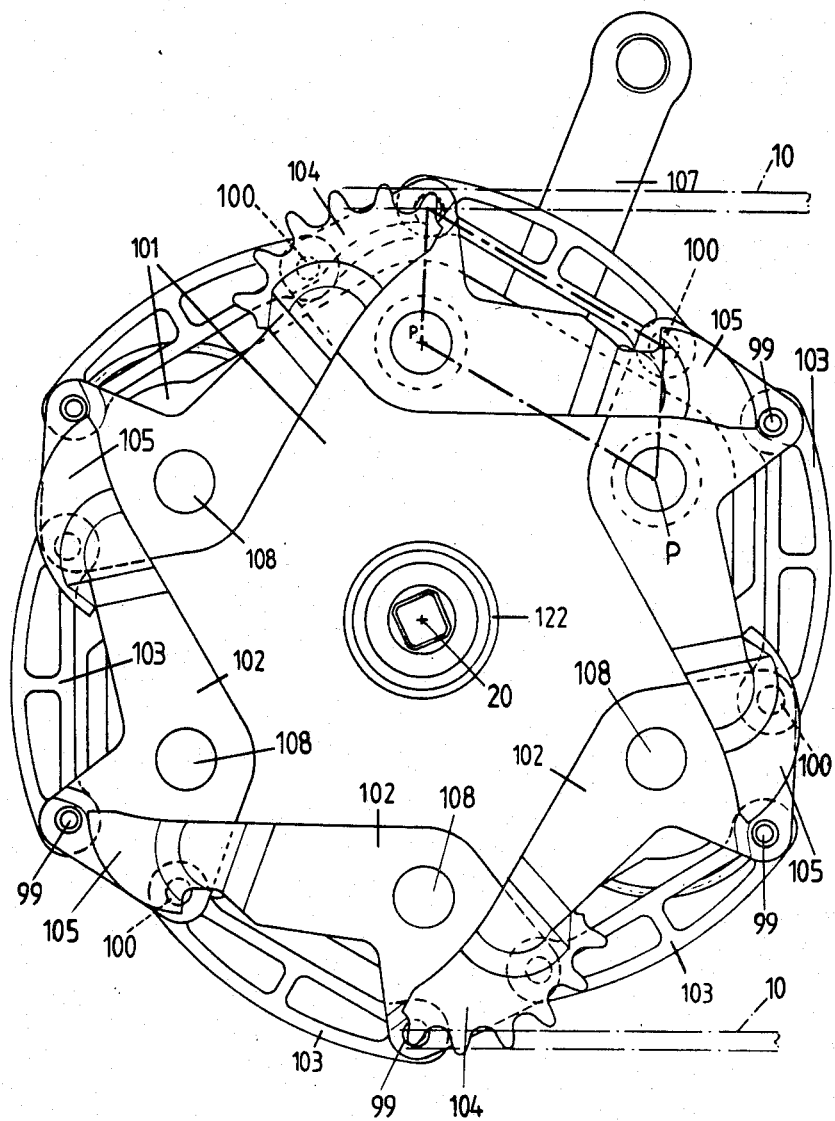
Figure 4:
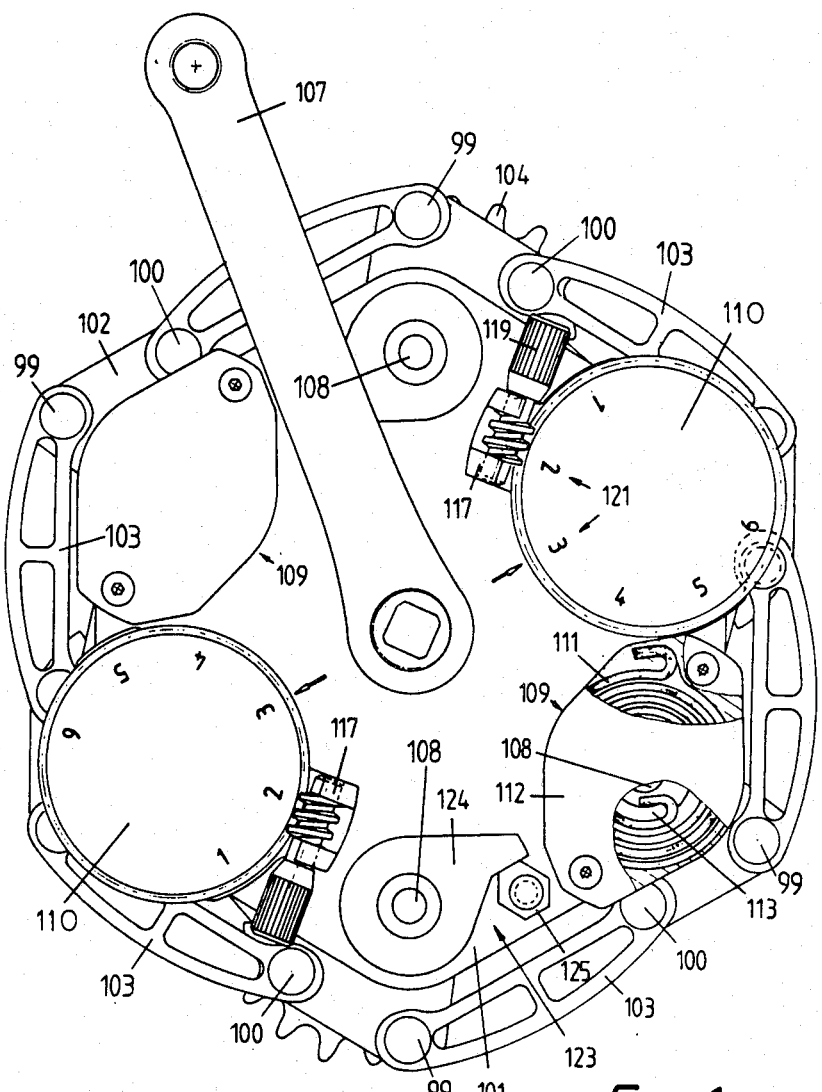
Figure 5:
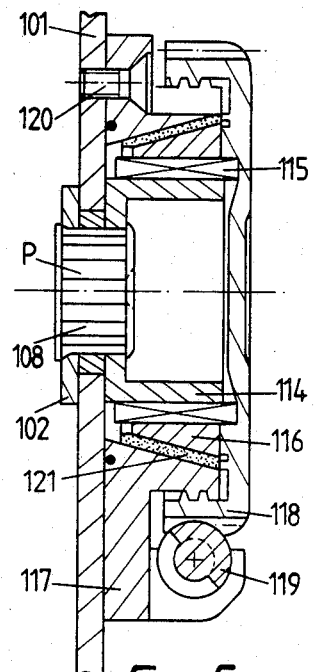
Figure 6:
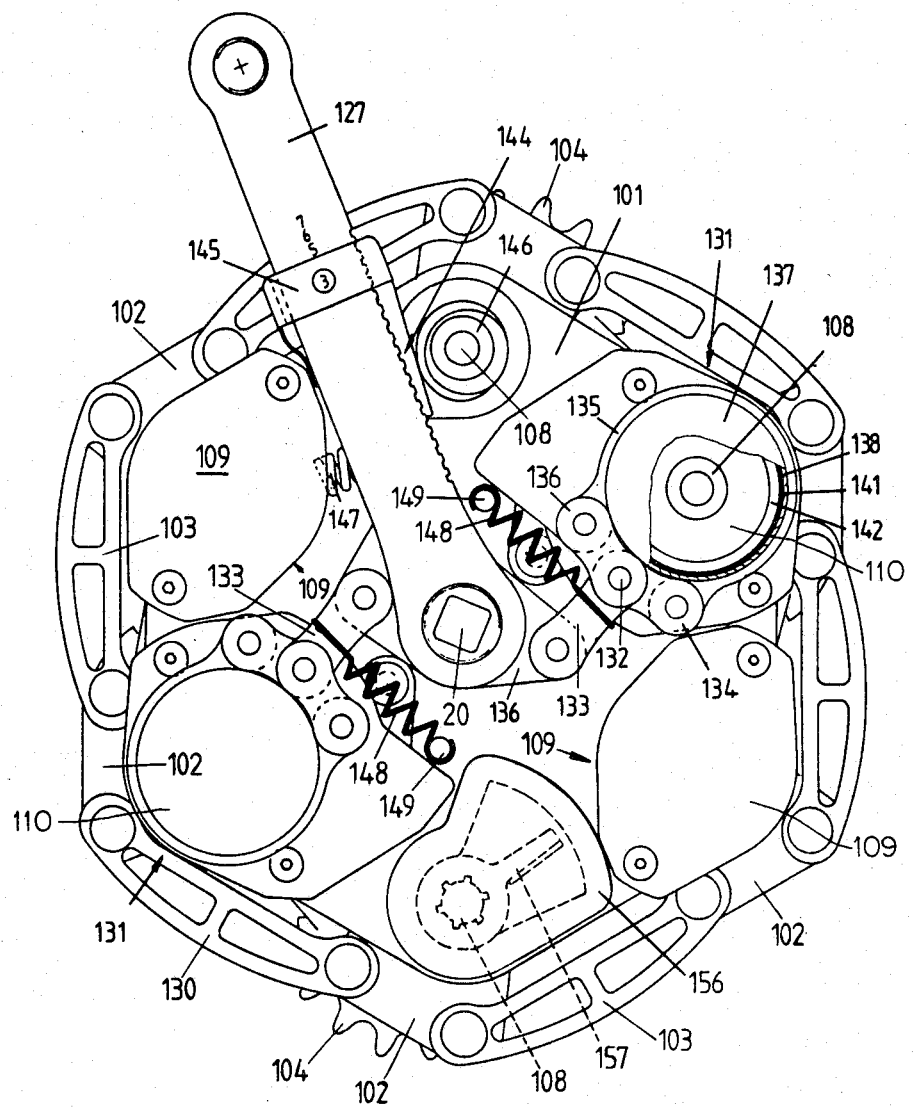

The variable diameter sprocket illustrated in FIGS. 3, 4 and 5 comprises a rotary disc 101, carrying six bell-crank levers 102, each mounted on a pivot spindle 108, with axis P, the disc also being rigidly secured to the crank 107.

Each lever arm 102 carries a contact element for engagement with the chain 10, two of these elements having teeth 104, while the other four elements 105 are smooth. When the arms 102 pivot the contact elements move radially in and out, thus altering the effective diameter of the sprocket. The smooth elements 105 merely contribute to the effective diameter of the sprocket, but do not apply tension to the chain. The arms 102 are caused to pivot in unison by six interconnecting links 103, pivotally connected to the six arms respectively at pivots 99,100 at opposite ends of each link. It will be seen that each link 103 with the respective two arms 102 forms a parallelogram linkage via the adjacent two pivots P, which are spaced apart by the same distance as the length of the link 103. This maintains exactly equal pivoting movement of all the arms, and ensures that the contact elements are always at the same radial distance from the rotary axis 20 of the disc.

It will be understood that the varying tension in the chain 10 not only applies a force to the toothed elements 104 but also causes a radial inward force acting on all the elements. Assuming that the sprockets exhibit no internal friction, if a simple spring acting outwardly is used to resist the rapidly varying inward radial force, it is necessary to "lock" the radial movement of the contact elements over the sectors of rotation where the spring would overcome the inward radial force, or when the radial force acts outwardly, otherwise the sprocket would repeatedly expand and contract at every revolution. FIG. 2 shows the cyclic changes in the turning "moment" exerted on each pivoted arm 102 about its pivot axis P, for five different effective sprocket diameters $D^1$ to $D^5$, taking into account the cyclic changes in chain tension, and illustrates graphically the need for "locking" of the contact elements, whenever the outward spring force S exceeds the radial force represented by the graph R. The sectors L where locking is required may be reduced by incorporating a one-way brake which exerts radial force B in parallel with and greater than the spring force S. The one-way brake resists movement of the contact elements inwards, but does not oppose outward movement and expansion of the sprocket diameter. It is important to note that if a two-way brake is used the brake force must be less than that of the spring, otherwise it is impossible for the sprocket diameter to increase when pedal pressure is reduced. If a one-way brake is used then the brake force can be greater than the spring force, so that a weaker spring can be used. This is very important when it is required to adjust the total resisting force (i.e. brake plus spring).

When pedal pressure increases, the radial force R will exceed the resisting force B and S and the chain wheel will shrink automatically, whereas pedal pressure must fall below the value of the resisting force (from which is deducted the brake force in the case of a one-way brake) before the chain wheel is allowed to expand. In practice, this means that the cyclist has to ease off pedal pressure momentarily when road conditions ease if he wants to increase the effective diameter of the sprocket wheel, and in that way maintain the previous pedal pressure. The above "hysteresis effect" between chain wheel contraction and expansion has the following advantages:

(i) The cyclist has greater control over the gear ratio selected, e.g. a lower gear ratio can be maintained if the rider is tired, simply by maintaining the necessary minimum pedal pressure.

(ii) The transmission is more 'stable' and erratic pedalling does not cause rapid undesirable changes in sprocket diameter.

(iii) Greater torques can be handled over short durations of time without having to adjust the resisting force (e.g. during sprints in races and when accelerating at start-up).

(iv) Any tendency for the chain wheel to 'jump' or 'slam' outwards when pedal pressure is suddenly released in the "unlocked" sector, is greatly reduced.

Cyclists of different strengths will create different inward radial forces and it is important that the mechanism should provide adjustment of the resisting force.

The design of the contact elements 104,105, both toothed and smooth, fixed on the ends of the arms 102, is very economical in manufacture and allows the effective diameter of the sprocket to contract to a small radius and also contributes to a nearly circular sprocket profile, particularly at minimum diameter. If the upper and lower "runs" of the transmission chain 10 are approximately parallel, the arrangement provides two "locked sectors" of approximately 60° rotation of the sprocket over which both toothed arms 104 engage with the chain 10 simultaneously, thereby effectively locking any possible wheel expansion.

The locking sectors can be enlarged to 90° sectors by causing the chain to wrap around a larger part of the circumference of the sprocket. This may be achieved by locating the tensioning sprockets 16,17 closer to the variable sprocket 12 as shown in FIG. 1.

The mechanism also includes two spring units 109 and two one-way brake units 110 acting directly on the pivot spindles P (108) of the arms 102 and hence influencing the radial positions of the contact elements 104,105. Each spring unit consists of a spiral spring 111 hooked at one end to a stop on a case 112 fixed rigidly to the disc 101. The other end of the spring is hooked onto a lug 113 secured to the adjacent pivot spindle P (108) of one of the pivoting arms. There are two such spring units (110) symmetrically positioned, and thus creating a substantially constant outward radial spring force on all six contact elements.

Each of the two one-way brake units 110 comprises a drum 114 (see FIG. 5) secured to the respective spindle P so as to pivot with the attached arm 102. A one-way roller clutch or freewheel 115 connects the drum 114 to a male cone 116 when the arm 102 turns in a direction to reduce the diameter of the sprocket. The clutch 115 freewheels when the sprocket expands. The male cone 116 is adjustably pressed into a female cone 117 by means of a resilient cap 118 screwed onto the cone 117 which is itself held rigidly onto the disc 101, by means of a bolt 120. A lining 121 made of special friction material is incorporated into the female cone 117. The angular position of the cap 118 may be adjusted by means of a worm gear 119 with an adjusting knob. Adjustment of the worm gear 119 varies the engaging pressure between the two cones 116,117, and so varies the effective radial braking force B exerted on the contact elements 104,105, quite independently of the spring force urging the contact elements outwards.

Before using the bicycle, the bicyclist adjusts the level of pedal pressure required to cause contraction of the sprocket diameter by rotating the two worm gears 119. Graduations on each cap 118 display the angular position of the cap relative to the female cone 117, and hence the amount of braking.

The sprocket mechanism also incorporates an annular stop 122 (FIG. 3) which limits the inward pivotal movement of the arms 102 and limits the value of the twisting force to which the arms are subjected, thus preventing damage.

In addition, an adjustable limiter 124 (FIG. 4) is provided to vary the maximum effective sprocket diameter, and thereby compensate for lengthening of the links as the chain wears. The limiter includes a lever fixed to the spindle 108 of one of the arms 102, and arranged to abut against an adjustable polygon stop 125 having sides at different radii, and adjustably mounted on a pivot pin attached to the disc 101.

In the modified construction illustrated in FIG. 6 the one-way brake is replaced by an automatic device to control the brake force in accordance with the force exerted on the crank 127.

In FIG. 6 parts similar to those in FIGS. 3 and 4 are indicated by the same reference numerals and will not be described again. In this example the crank 127 is free to pivot through a small angle relative to the disc 101 about the axis of rotation 20.

There are two controlled brake units 131 on opposite sides of the crank. Each brake unit includes an inner drum 142 secured to the respective spindle pivot 108 of one of the arms 102, and a resilient housing 137 having a cylindrical wall 138 which surrounds the drum 142, with an interposed friction brake lining 141. The housing 137 is rigidly attached to the disc 101 and cannot rotate. The housing wall 138, which acts as the outer brake drum, is surrounded by a band 135, which exerts an adjustable grip, the ends of the band being pivotally connected to two toggle links 134,136, which are both connected at 132 to a tension link 133. The two links 133 are pivotally attached to a flange 126 fixed to the crank 127, so that small twisting movement of the crank in one direction relative to the disc 101 creates tension in the links 133, and thereby operates the toggle links to cause the band 135 to grip the outer brake drum 138. The torque applied by the crank is resisted by the natural resilience of the parts 133–136, so that increasing torque produces a small pivotal movement of the crank and generates an increasing brake force.

Up to a certain maximum value the torque transmitted by the crank 127 is transferred to the disc 101 via the links 133, and the amount of braking may be adjusted by limiting the amount of crank torque transmitted in this way. It will also be seen that when the crank torque is reversed or falls below a predetermined value there will be no braking force, thus providing an effect somewhat similar to the one-way brake of FIGS. 3 and 4.

The travel of the crank is limited by means of an adjustable stop which comprises a spring-loaded slider 145 having a sloping flank 144, and moveable along the crank 127, the flank being arranged to contact a pivoted cam 146 which is fixed to the spindle 108 of one of the pivoting arms 102. This alters the maximum limit of travel of the crank in accordance with changes in the positions of the arms 102, and in this way creates a braking force which varies as the sprocket assumes different diameters. Any excess of crank torque above the amount transmitted via the links 133 is taken by the stop 146 and the chain wheel will shrink to a smaller diameter when the crank torque becomes such that the resisting torque equals the arm torque. Backlash is absorbed by a spring 147.

The brake linings 141 in the brake units of FIG. 6 are, of course, liable to wear and as the linings become thinner certain problems may develop. The band 135 can close more tightly around the brake drums and the links 134,136,133, can therefore extend, thus reducing the efficiency of the toggle linkage geometry 134,136 and also reducing the useful travel of the crank 127. This problem is obviated by an automatic wear compensator, as illustrated in FIG. 8, combined with a pair of tension springs 148 (FIG. 6), each acting between one of the links 133 and a fixed pin 149 attached to the disc 101. The springs thus tend to rotate each band 135 clockwise. As seen in FIG. 8 the band 135 has six internal ramps 158 and the wall 138 of the housing 137 has six corresponding ramps 159. Therefore if the lining 141 wears and a small radial gap develops between the inner drum 142 and the lining 141, the band 135 will rotate clockwise under the springs 148 thus causing the band to tighten onto the drum. If the incline of the ramps 158,159 is correctly chosen this arrangement compensates for wear in the brake lining without affecting the operation of the brake.

In some situations the springs 111 can cause difficulties. For example, if the bicycle is parked with the contact elements fully contracted and the springs fully stressed, there is a risk that the arms 102 may jump outwards if the mechanism moves away from the locked position. This could be dangerous and accordingly the mechanism also includes a hydraulic damper, as shown in FIG. 6. One of the spindles 108 is attached to a hydraulic damper vane 157 movable in a sextant casing 156, the casing being filled with a viscous silicone fluid and the vane being arranged to provide a controlled clearance, which allows pivotal movement of the spindle 108 at a controlled rate.

The housing 137 also encloses a detent system (FIG. 7) which tends to bias the effective diameter of the sprocket to the values which correspond to whole numbers of effective teeth. The detent system comprises a quadrant plate 152 having notches engaging with a pawl 153 pivotally mounted on a pin 154 attached to the disc 101, and engaged by a spring 155. This is the non-positive resilient detent system referred to above, which urges the mechanism into one of a series of preferential positions.

FIGS. 9 and 10 illustrate another form of the invention having a hydraulic control system. In FIG. 9 there are two hydraulic modules 161 each pivotally attached to the disc 101 at one end by means of a pin 163, and having a piston rod 166 at the other end, which engages a lever arm 165 secured to the spindle 108 of one of the swinging arms 102. The piston rod therefore either maintains or expands the sprocket diameter or resists contraction of the sprocket.

As seen diagrammatically in FIG. 10 each hydraulic control module 161 comprises a common housing 175 containing a cylinder 171, an adjustable relief valve 173, and a gas accumulator 174. The rod 166 is connected to a piston 160, arranged to displace fluid from the cylinder 171 into a cross passage 176. When the oil pressure exceeds the opening pressure of the relief valve 173, the relief valve 173 opens and oil flows to the accumulator 174 through the port 177. The piston 160 moves down the cylinder 171 and the effective diameter of the sprocket contracts. The relief valve pressure is a function of both the gas-oil pressure in the accumulator 174 and the setting of the spring 178, which may be adjusted by means of a screw 181. The value of the pressure setting is displayed on the hydraulic housing 175 by means of a slider 182 working jointly with a scale 183 (see FIG. 9).

If the forces tending to contract the sprocket diameter fall to the point where oil pressure in the cylinder 171 and in the cross line 176 become less than the pressure of the gas-oil in the accumulator 174 minus the pressure loss across the check valve 172, the check valve 172 opens and oil flows back from the accumulator 174 to the cylinder 171, pushing the piston 166 upwards in the cylinder 171. Therefore the sprocket diameter expands. By restricting the oil lines, it is possible to adjust the maximum speeds of any piston movement in the cylinder and very smooth shifting can be achieved. In particular, the expandible sprocket is always prevented from "jumping" outwardly when pedal pressure is suddenly removed.

It will be seen that the hydraulic module as described differs fundamentally from a simple hydraulic dynamic damper. The relief valve 173 only opens when the pressure differential exceeds a datum level, and thus tends to prevent the piston moving from its instantaneous position. When the piston starts to move downwards the fluid flow is restricted and energy is absorbed, but when the force above the piston is relieved the check valve 172, set at a very low pressure, opens immediately allowing relatively free reverse movement.

The resilient means acting outwardly on the contact elements, e.g. the spring units 109 or the gas-oil accumulators 174, are conveniently adjustable, to accommodate riders of different strength. The gas-oil accummulator may be adjusted, for example, by supplying or removing gas under pressure through the filling valve 184. In the case of mechanical springs, as shown at 109 in FIG. 4, the adjustment can be achieved by turning the whole case 112 and fixing it in a new angular position on the disc 101. It will be seen that the design of the sprocket also provides an automatic control of sprocket diameter in accordance with changes in the rotary speed of the disc 101. The pivot 108 of each of the arms 102 is displaced from the centre of gravity of the arm and the centrifugal force on each arm tends to throw the contact element 104,105 outwards to increase the effective diameter. This effect is more pronounced of course in high-speed industrial transmissions.

I claim:

1. A rotary drive device for a variable ratio transmission mechanism including an endless flexible tension element, the device comprising a rotary support carrying a plurality of angularly spaced contact elements for the tension element, the contact elements being movable to vary their radial displacement from the axis of said support, and including resilient means urging said contact elements outwards, an input drive member, which is capalbe of limited rotation relative to said support, and control means arranged to exert a resisting force on the movement of the contact elements, said control means being responsive to changes in the torque transmitted between said input drive member and said rotary support, and arranged to vary a braking force restraining inward movement of said contact elements, in dependence on the torque applied by said input drive member.

2. A rotary drive device for a variable ratio transmission mechanism including an endless flexible tension element, the device comprising a rotary support carrying a plurality of angularly spaced contact elements for the tension element, the contact elements being movable to vary their radial displacement from the axis of said support, and including resilient means urging said contact elements outwards, and control means arranged to exert a resisting force on the movement of the contact elements, said control means being constructed and arranged to resist inward movement of said contact elements more strongly than outward movement.

3. A rotary drive device for a variable ratio transmission mechanism including an endless flexible tension element, the device comprising a rotary support carrying a plurality of angularly spaced contact elements for the tension element, the contact elements being movable to vary their radial displacement from the axis of said support, and including resilient means urging said contact elements outwards, and control means arranged to exert a resisting force on the movement of th- contact elements, said control means comprising a uni-directional friction brake.

4. A rotary drive device for a variable ratio transmission mechanism including an endless flexible tension element, the device comprising a rotary support carrying a plurality of angularly spaced contact elements for the tension element, the contact elements being movable to vary their radial displacement from the axis of said support, and including resilient means urging said contact elements outwards, and control means arranged to exert a resisting force on the movement of the contact elements, said control means including a friction brake, and means for compensating automatically for wear in said brake.

5. A rotary drive device for a variable ratio transmission mechanism including an endless flexible tension element, the device comprising a rotary support carrying a plurality of angularly spaced contact elements for the tension element, the contact elements being movable to vary their radial displacement from the axis of said support, and including resilient means urging said contact elements outwards, and control means arranged to exert a resisting force on the movement of the contact elements, said control means including a hydraulic control system.

6. A transmission device according to claim 5, in which said hydraulic control system is arranged to exert a damping effect on the movement of said contact elements, and includes means for altering the flow to vary the damping effect.

7. A transmission device according to claim 5, in which the damping action of said hydraulic control system is uni-directional, and resists inward movement of said contact elements.

8. A transmission device according to claim 5, in which the damping action of said hydraulic control system provides a resisting force acting inwardly on said contact elements, and acts to prevent sudden outward movement of said contact elements.

9. A rotary drive device for a variable ratio transmission mechanism including an endless flexible tension element, the device comprising a rotary support carrying a plurality of angularly spaced contact elements for the tension element, the contact element being movable to vary their radial displacement from the axis of said support, and including resilient means urging said contact elements outwards, control means arranged to exert a resisting force on the movement of the contact elements, and a stop, limiting the radial movement of said contact elements.

10. A drive device according to claim 9, wherein said stop is movable and automatically adjustable in response to changes in the radial displacement of said contact elements.

11. A rotary drive device for a variable ratio transmission mechanism including an endless flexible chain, the device comprising a rotary support carrying less than four angularly spaced toothed contact elements to engage said chain, and including additional non-toothed contact elements interposed between said toothed contact elements, all said toothed and non-toothed elements being mounted on swinging arms pivotally attached to said support, to vary the radial displacement of said elements from the axis of said support, and including resilient means urging said contact elements outwards, and control means arranged to exert a variable resisting force on the movement of the contact elements.

12. A rotary drive device for a variable ratio transmission mechanism including an endless flexible tension element, the device comprising a rotary support carrying a plurality of angularly spaced contact elements for the tension element, the contact elements being movable to vary their radial displacement from the axis of said support, and including resilient means urging said contact elements outwards, control means arranged to exert a variable resisting force on the inward movement of the contact elements, and a system for locking the outward radial movement of said contact elements over part of their range of movement around the axis of rotation of said support.

13. An automatic variable transmission drive for a bicycle, including an endless flexible chain, a rotary support mounted on said bicycle and carrying a plurality of angularly spaced toothed contact elements for said chain, the contact elements being movable to vary their radial displacement from the axis of said support, and including resilient means urging said contact elements outwards, and control means arranged to exert a resisting force on the movement of the contact elements.

14. A rotary drive device for a variable ratio transmission mechanism including an endless flexible tension element, the device comprising a rotary support carrying a plurality of angularly spaced contact elements for the tension element, the contact elements being movable to vary their radial displacement from the axis of said support, and including resilient means urging said contact elements outwards, and control means arranged to exert a resisting force on the movement of said contact elements, said control means being connected to said contact elements and responsive to radial movement thereof, and in which said control means is automatically adjustable to vary the resisting force acting inwardly on said contact elements, in accordance with the radial movement of said contact elements relative to said support.

* * * * *